(12) United States Patent
Gardner (10) Patent No.: US 6,273,780 B1
(45) Date of Patent: *Aug. 14, 2001

(54) EDIBLE ACCESSORIES FOR CONVENTIONAL TOYS

(75) Inventor: Valerie Gardner, 1117 Greenwich St., San Francisco, CA (US) 94109

(73) Assignee: Valerie Gardner, Atherton, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/002,473

(22) Filed: Jan. 2, 1998

(51) Int. Cl.⁷ .................. A63H 3/20; A63H 3/36
(52) U.S. Cl. .................. 446/268; 446/386; 426/104
(58) Field of Search .................. 426/104; 446/386, 446/268, 72, 71

(56) References Cited

U.S. PATENT DOCUMENTS

| | | | |
|---|---|---|---|
| D. 242,645 | 12/1976 | Shorin et al. | D45/10 C |
| D. 242,646 | 12/1976 | Shorin et al. | D11/2 |
| 296,897 | * 4/1884 | Urso | 426/104 |
| 1,239,378 | * 9/1917 | Foster | 426/104 |
| 1,383,290 | * 7/1921 | Cressey | 426/104 |
| 1,390,667 | * 9/1921 | Bonestell | 426/104 |
| 1,668,524 | * 5/1928 | Bogue | 426/104 |
| 2,085,414 | 6/1937 | Cavanagh . | |
| 2,532,729 | 12/1950 | Millstein . | |
| 2,628,169 | * 2/1953 | Berthold | 426/104 |
| 3,821,423 | * 6/1974 | Jamin | 426/104 |
| 4,215,843 | 8/1980 | Gay et al. | 249/78 |
| 4,333,974 | * 6/1982 | Davis | 426/104 |
| 4,508,512 | 4/1985 | Girsch et al. | 434/259 |
| 4,943,063 | * 7/1990 | Moreau | 426/104 |
| 4,966,305 | * 10/1990 | Hinterreiter . | |
| 4,978,030 | 12/1990 | Morris et al. | 221/3 |
| 5,545,069 | * 8/1996 | Glynn et al. | 446/73 |
| 5,573,438 | * 11/1996 | D'Andrea | 446/386 |
| 5,728,414 | * 3/1998 | Terrasi | 426/104 |
| 5,743,782 | * 4/1998 | Glynn et al. | 446/386 |

* cited by examiner

Primary Examiner—D. Neal Muir
(74) Attorney, Agent, or Firm—Blakely, Sokoloff, Taylor & Zafman, LLP (57) ABSTRACT

An edible toy accessory is disclosed comprising a toy accessory composed of an edible material and shaped into a form usable as an accessory with an associated stand-alone toy, the associated stand-alone toy having independent amusement value when used without the toy accessory.

16 Claims, 8 Drawing Sheets

EDIBLE ACCESSORIES FOR CONVENTIONAL TOYS

BACKGROUND OF THE INVENTION

1. Field of the Invention

The present invention relates to the field of toys, models, or playthings. Specifically, the present invention relates to accessories for conventional stand-alone toys, models, or playthings.

2. Description of Related Art

Edible toys are well known in the prior art. For example, gingerbread houses and candy canes are examples of edibles that may be classified as toys. Other examples include edible material formed in shapes that may resemble characters or figures that might appeal to children. Gummy bears, chocolate Easter bunnies, and candy corn are other examples of edibles formed into familiar shapes.

Other examples of edible toys in the prior art include edible components combined with non-edible dispensers or containers for the edibles. For example, U.S. Pat. No. 2,085,414 involves a container for packaging candies for children. The container simulates the face of a character, such as a person, with eye-like openings. Adjustments on the container are provided for rearranging the colored candies inside to change the colors of the eye-like openings for amusement.

U.S. Pat. No. 4,978,030 describes a candy container configured as a fowl, or the like, with the contained candy shaped like an egg. Squeezing or compressing the container causes an egg candy to be ejected from an orifice on the bottom of the container and simultaneously generating air pressure to activate a reed-type sound generator located in the bill of the container.

Other examples of edible components combined with non-edible toys include the use of edibles resembling miniature doughnuts, sold under the registered trademark "SMARTIES", strung together and sold as a necklace. In another example, under U.S. Pat. Nos. DE242646/242645, the use of a hard translucent candy resembling a gemstone attached to a finger ring holder is sold under the trademark "RINGPOP".

U.S. Pat. No. 2,532,729 describes a transparent container formed and colored like the body of Santa Claus, open at the top and having a closure in the form of the head of Santa Claus. The head is threaded onto the body in such a manner that less than half a turn is needed to assure a tight connection. Inside the transparent container, or body, are multicolored candies. The body of Santa Claus operates as a container for the candies.

U.S. Pat. No. 4,508,512 describes a shape-matching toy with a first plate having a plurality of different shaped apertures therein and a plurality of block elements of corresponding shapes which are receivable in the apertures.

Other examples include candies sold with a container under the trade name "PEZ". This product is used to dispense rectangular shaped candies from a non-edible rectangular shaped and spring-loaded dispenser.

U.S. Pat. No. 5,545,069 describes an illuminable toy having an illuminable edible that can be soft or hard crystal candy or other translucent or transparent food in a figure form which is attached to a holder which is in turn part of or attached to a base. Concealed inside the base are a light source and a battery for illuminating the edible.

U.S. Pat. No. 4,215,843 describes a toy molding apparatus for making toy figures of a flexible or edible character. This patent represents prior art for forming toy figures from edible materials.

These examples of prior art, and other similar conventional techniques, however, do not describe the formulation or use of edible toy accessories for use with conventional stand-alone toys or models. In prior art implementations having an edible portion and a non-edible portion, the non-edible portion has no independent or stand-alone utility without the edible portion. For example, in the prior art container implementations, the container is of no use once the candy is gone.

Thus, a method and apparatus for making and using edible toy accessories for conventional stand-alone toys is needed.

SUMMARY OF THE INVENTION

The present invention is an edible toy accessory for use with conventional standalone toys. The present invention is an edible toy accessory comprising a toy accessory composed of an edible material and shaped into a form usable as an accessory with an associated stand-alone toy, the associated stand-alone toy having independent amusement value when used without the toy accessory.

BRIEF DESCRIPTION OF THE DRAWINGS

The features and advantages of the present invention will be apparent from the accompanying drawings and from the detailed description of the present invention as set forth below.

DETAILED DESCRIPTION OF THE PREFERRED EMBODIMENT

The present invention is a means and method for formulating and using edible toy accessories for conventional stand-alone toys. In the following detailed description, numerous specific details are set forth in order to provide a thorough understanding of the present invention. However, it will be apparent to one of ordinary skill in the art that these specific details need not be used to practice the present invention. In other instances, well known structures, materials, and processes have not been shown in detail in order not to unnecessarily obscure the present invention.

Figure 1:
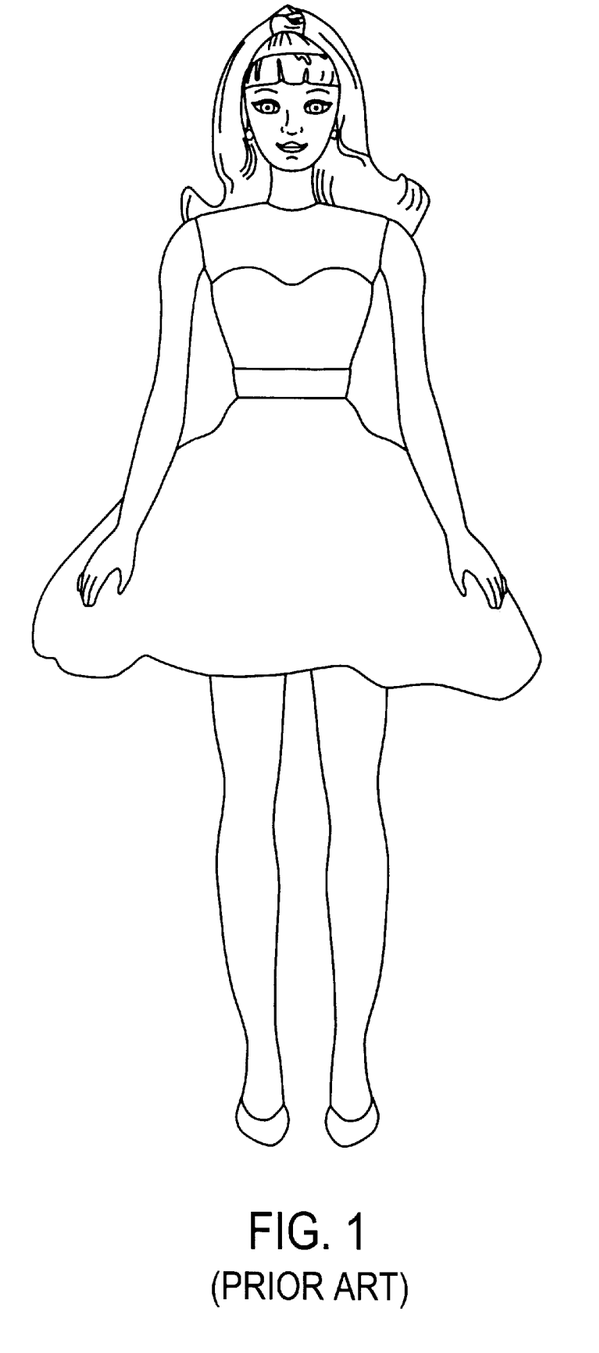
FIG. 1 illustrates an example of a prior art conventional stand-alone toy.

Referring now to FIG. 1, a prior art conventional toy doll is illustrated. FIG. 1 represents an example of a conventional non-edible toy for which the edible toy accessories of the present invention may be used. It will be apparent to one of ordinary skill in the art that the conventional non-edible toy illustrated in FIG. 1 may be one of a large variety of equivalent conventional toys currently available. For example, although FIG. 1 illustrates a conventional "Barbie" doll manufactured by Mattel Corporation, the conventional toy so illustrated may also be any other type of doll or play action figure in the prior art. The edible toy accessories of the present invention are packaged in plastic wrap 220 to retain freshness and prevent contamination. Alternatively, wrap 220 may be a bubble wrap or foil wrap or other type of conventional wrapping.

Figure 2:
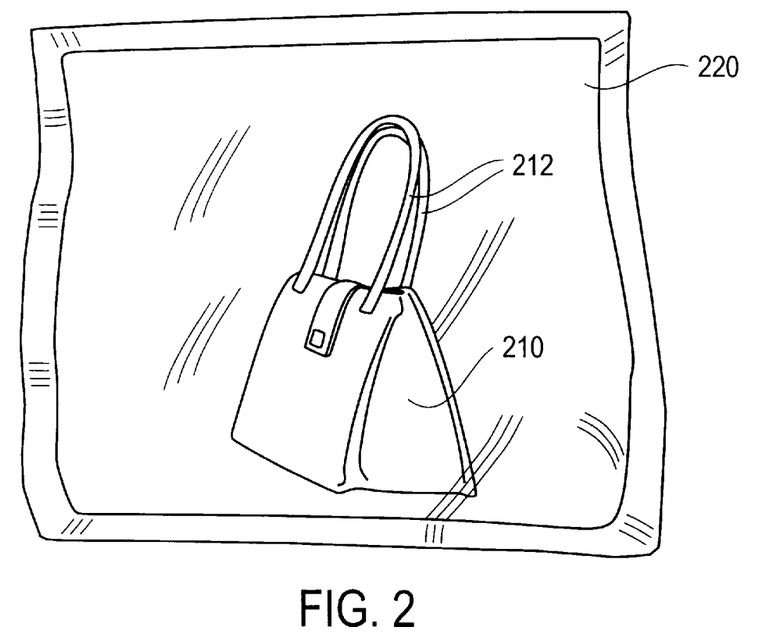
FIGS. 2 through 5 illustrate examples of the edible toy accessories of the present invention for use with a conventional stand-alone toy.

Referring now to FIGS. 2 through 5, examples of the edible toy accessories of the present invention for use with the conventional toy illustrated in FIG. 1 are shown. Referring to FIG. 2, a handbag accessory is illustrated. According to the present invention, the handbag, illustrated in FIG. 2, is fabricated using conventional techniques from edible materials. For example, the enclosed portion of the handbag 210 is fabricated from an edible gelatin-type material (commonly referred to as "gummy bear" material). Alternatively, a dried fruit material may be used. Conventional techniques may be used for fabricating an edible gelatin-type material into a shape representing a handbag of a dimension suitable for use as an accessory to a conventional toy such as the doll illustrated in FIG. 1. In addition, the handbag straps 212 may be fabricated from either the same edible gelatin material used for the enclosed portion 210 or from a different edible material such as black licorice or a rolled length of dried fruit. In this manner, although the entire handbag shown in FIG. 2 is edible, the handbag is fabricated from two or more different types of edible materials. Again, conventional techniques may be used to bond the black licorice straps 212 or other type of edible material to the gelatin-type material used for the enclosure 210.

Figure 3:
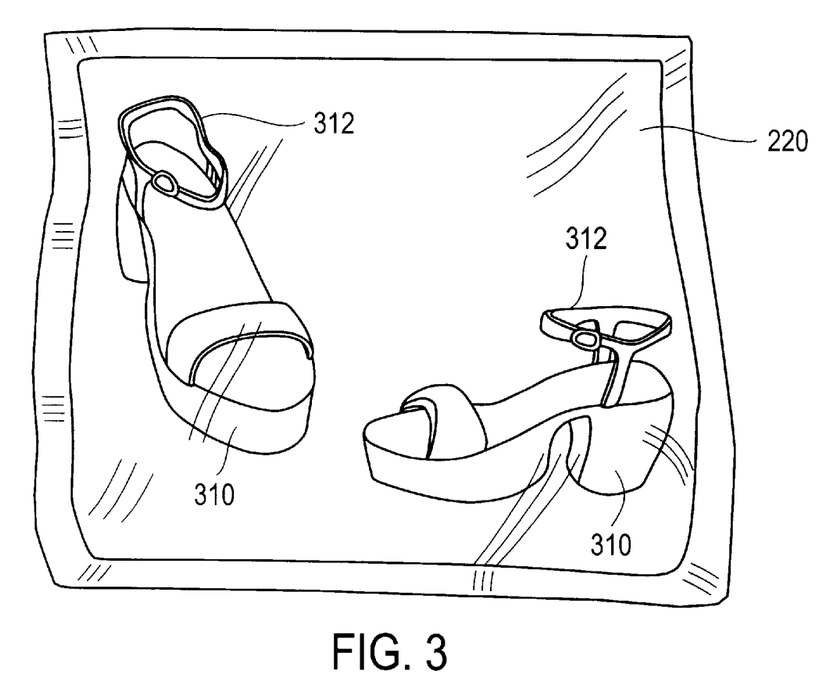

Referring now to FIG. 3, another embodiment of the edible toy accessories of the present invention is illustrated. In this example, an edible pair of slip-on clog sandals is shown. As with the example shown in FIG. 2, the sandals are fabricated from edible materials in a form and dimension for use as edible toy accessories for a conventional toy such as the doll illustrated in FIG. 1. The sandals in the embodiment illustrated in FIG. 3 are fabricated from two different types of edible material. The soles 310 of the clog sandals are fabricated form a hard candy material that may be formed into a shoe or sandal sole using conventional techniques. The straps 312 of the sandals may be fabricated from a red licorice or gelatin-type material. Both the hard candy and red licorice or gelatin-type material are both edible materials. These edible materials may be formed into a variety of shapes using conventional methods. In each case, the edible toy accessories may be used with the conventional toy such as the doll illustrated in FIG. 1.

Figure 4:
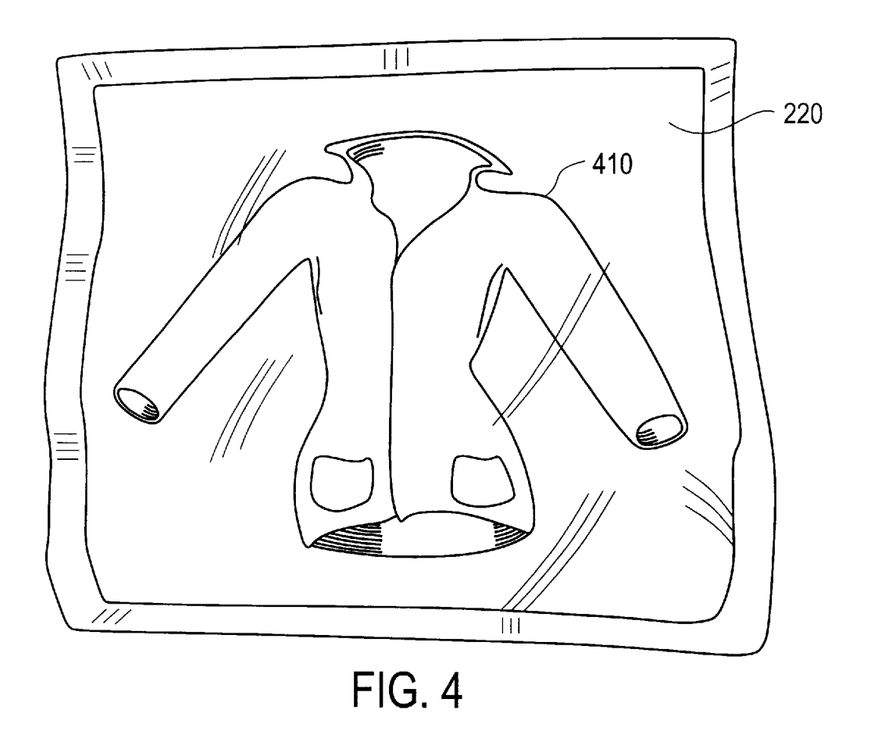

Referring now to FIG. 4, an edible garment 410 for use as an edible toy accessory for the conventional doll illustrated in FIG. 1 is shown. In the example of FIG. 4, an edible jacket is shown. The jacket may be formulated from black licorice or black gelatin-type edible material to represent a garment fabric resembling black leather. Black licorice may be formed into such a garment using conventional techniques. The edible garment, such as the one illustrated in FIG. 4, is fabricated in a size suitable to be worn by a toy figure as an edible toy accessory for the conventional doll such as the doll illustrated in FIG. 1.

Figure 5:
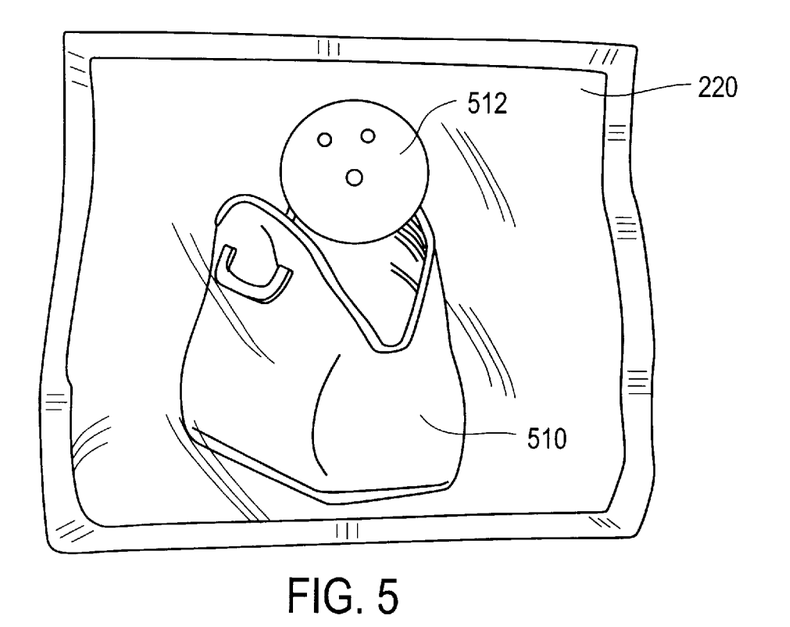

FIG. 5 illustrates another example of an edible toy accessory. In this example, a doll-sized bowling ball bag 510 with a miniature bowling ball 512 therein is shown. In this example, the bowling ball bag 510 is fabricated from a gelatin-type material such as a "gummy bear" material similar to that used for the handbag 210 example shown is FIG. 2. As available in the prior art, such materials can be obtained in a variety of colors and can be formulated into a shape resembling a doll-sized bowling ball bag 510 such as the one illustrated in FIG. 5. As a further enhancement to the edible toy accessory bowling ball bag 510 illustrated in FIG. 5, a miniature toy bowling ball 512 is included. In the present invention, the miniature toy bowling ball can be fabricated from a conventional gumball coated with color and graphics to represent a bowling ball. As will be apparent to those of ordinary skill in the art, the entirety of the bowling ball bag 510 and bowling ball 512 is edible. This edible toy accessory may be fabricated using conventional techniques in a form and dimension suitable for use as an edible toy accessory for the conventional doll such as the doll illustrated in FIG. 1.

The edible toy accessories of the present invention, such as those shown by example in FIGS. 2 through 5, can be assembled into theme packages. Such theme packages represent a set of edible toy accessories representing a common theme which are bundled together in a common plastic wrapping 620. Several examples of the edible toy accessory theme packages are illustrated in FIGS. 6 through 9.

Figure 6:
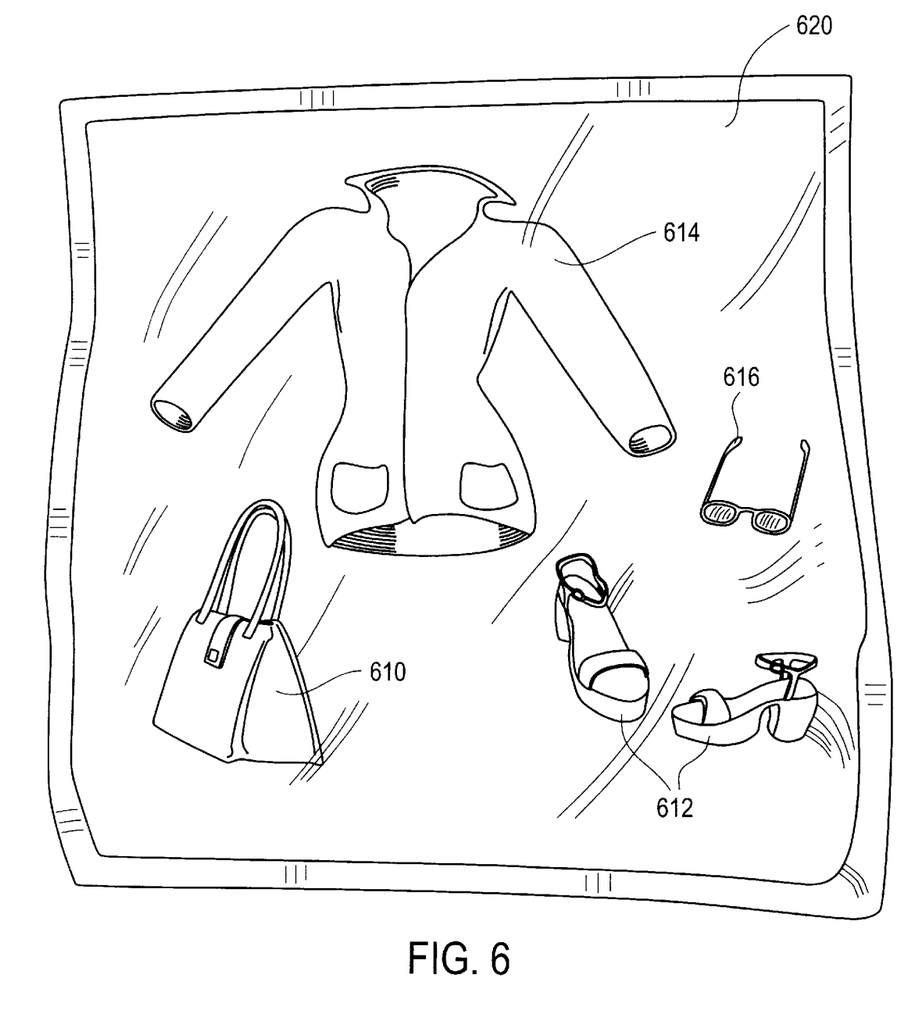
FIGS. 6 through 9 illustrate examples of the edible toy accessories of the present invention as assembled into theme packages.

Referring now to FIG. 6, a first edible toy theme package is illustrated. In this example, an edible purse 610 (such as the edible toy purse illustrated in FIG. 2)- is combined in a theme package with edible shoes 612 (such as the edible sandals illustrated in FIG. 3), and an edible jacket 614 (such as the edible toy jacket illustrated in FIG. 4), and with edible doll-sized sunglasses 616 fabricated from a black licorice or dark gelatin material formed in the shape of toy sunglasses suitable for use as an accessory to a doll such as the conventional doll illustrated in FIG. 1. The edible toy accessory theme package illustrated in FIG. 6 demonstrates an example of a collection of edible toy accessories representing a common theme.

Figure 7:
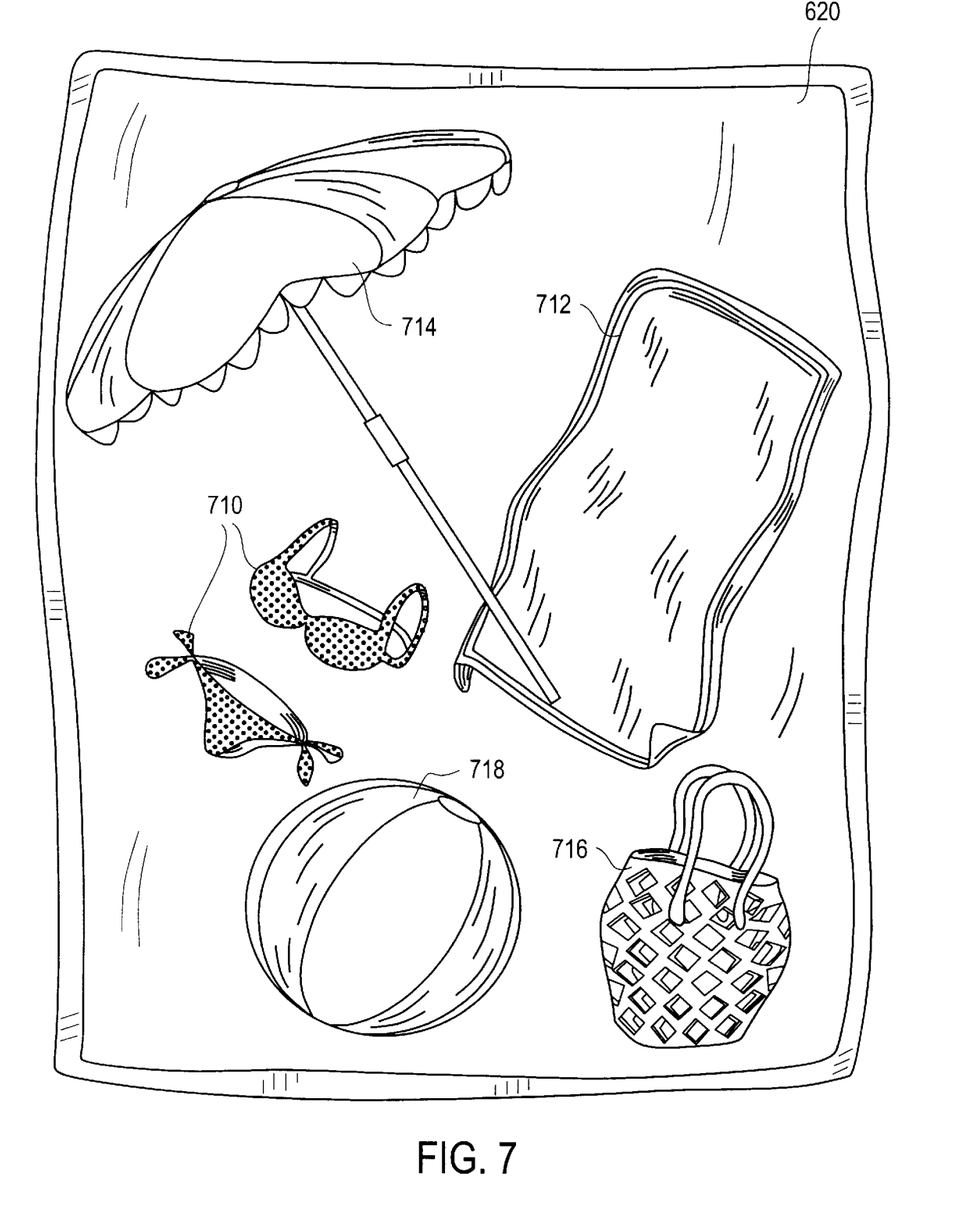

Referring now to FIG. 7, a second example of the edible toy accessory set theme package of the present invention is illustrated. In this example, five edible toy accessories are combined to support a beach play scenario. In this example, edible toy accessories representing a bikini 710, a blanket 712, or a beach umbrella 714 may be fabricated from gelatin-type edible materials using conventional methods. In addition, a beach bag 716 and beach ball 718 fabricated from edible materials may also be included in the edible toy accessory theme package 620 shown in FIG. 7. The beach bag 716 and beach ball 718 may be fabricated in a manner similar to the bowling ball 512 and bowling ball bag 510 illustrated by example in FIG. 5. In support of the beach play theme, the theme package illustrated in FIG. 7 represents a combination of edible toy accessories suitable for use with a doll or action figure such as the doll illustrated in FIG. 1.

Figure 8:
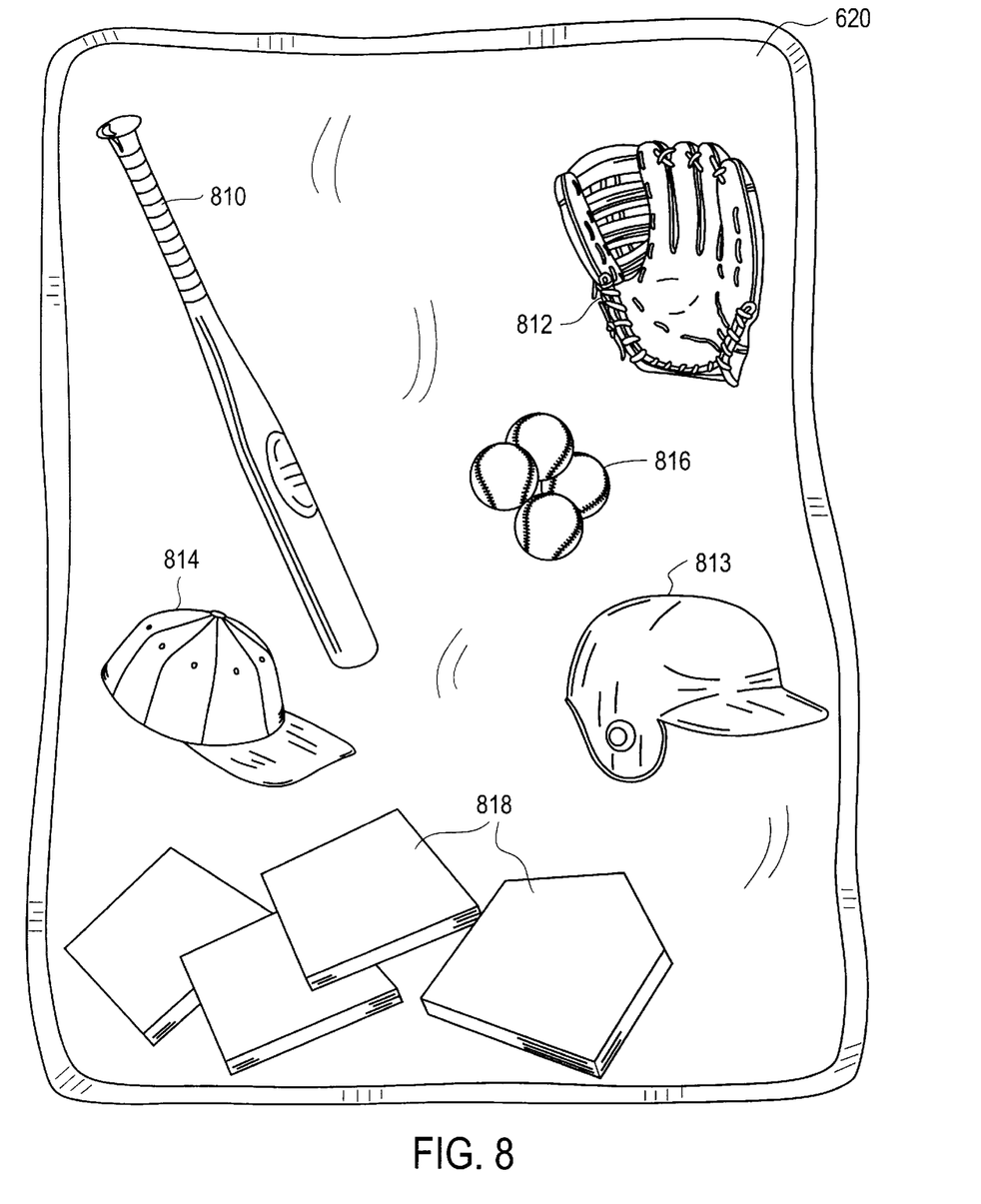

FIG. 8 represents another example of a theme package of the present invention. In this example, a baseball theme is supported by a collection of edible toy accessories associated with baseball. In this example, a baseball bat 810 is fabricated from a hard candy material into a shape representing a toy baseball bat of a dimension suitable for use with a conventional doll or action figure. A toy baseball glove 812 can be fabricated from gelatin-type materials or licorice materials into a shape representing a baseball glove. Similarly, baseball helmets 813, caps 814 and uniforms (not shown) may be formulated from edible gelatin-type materials such as those illustrated by example in FIG. 4 and 6. Baseballs 816 may be fabricated from small gumballs or small round hard candies. Bases 818 may also be fabricated using hard candies or rectangular pieces of gum formed to represent bases for use on a miniature baseball field. It will be apparent to one of ordinary skill in the art that edible materials may be used to formulate other accessories consistent with a baseball theme.

Figure 9:
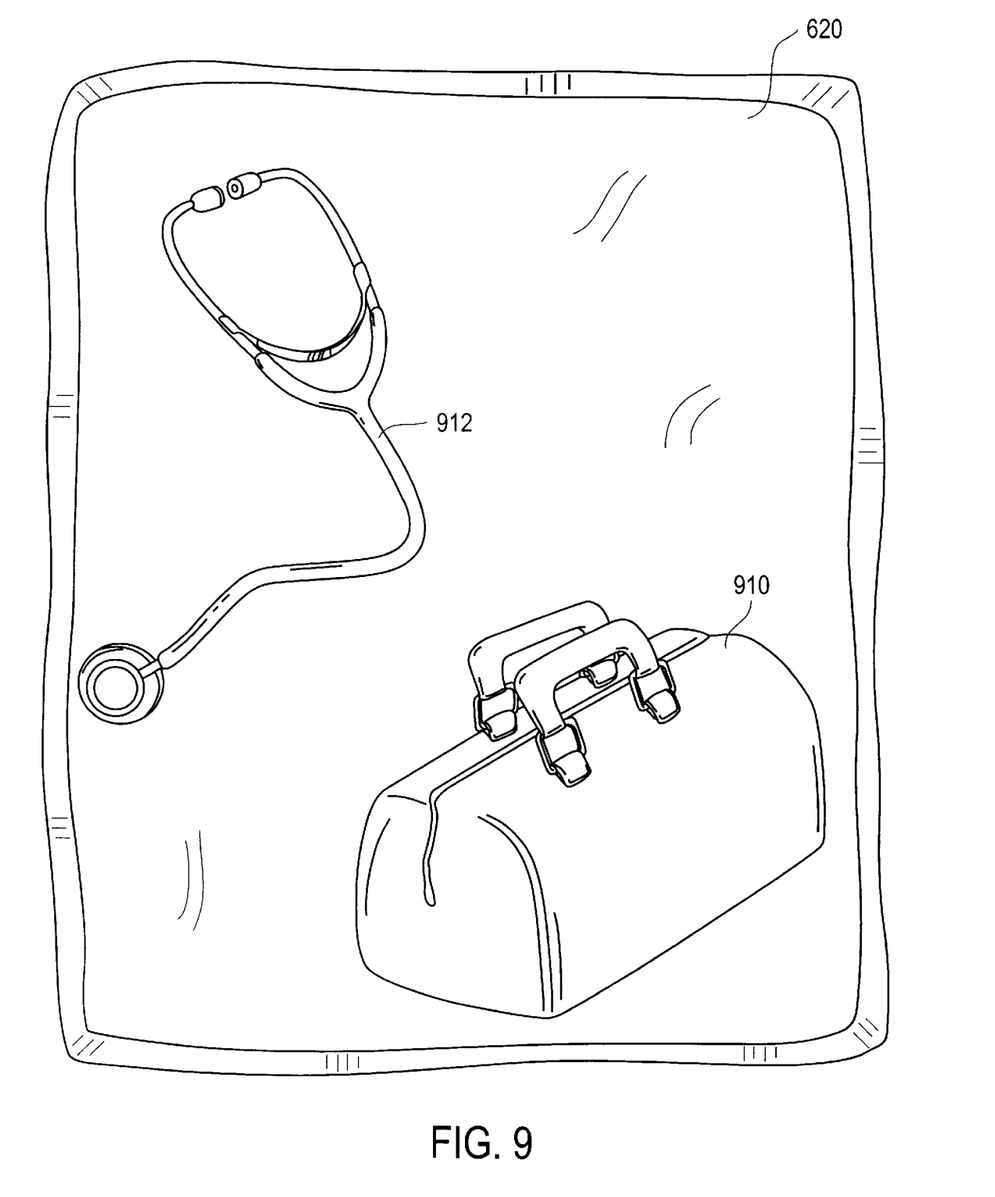

FIG. 9 illustrates yet another example of the theme packages of the present invention. In this example, a medical theme is supported with edible toy accessories representing medical devices or medical-related accessories. In the example of FIG. 9, a doctor bag 910 fabricated from a licorice or dark gelatin material is illustrated. Such a bag may be formulated in the manner similar to that illustrated in FIG. 2 or FIG. 5 as described above. In addition, a toy edible stethoscope 912 may be fabricated from strands of licorice or other flexible edible material. In this manner, a doctor theme is supported by a set of edible toy accessories for use with a conventional toy such as the doll illustrated in FIG. 1.

Figures 10, 11:
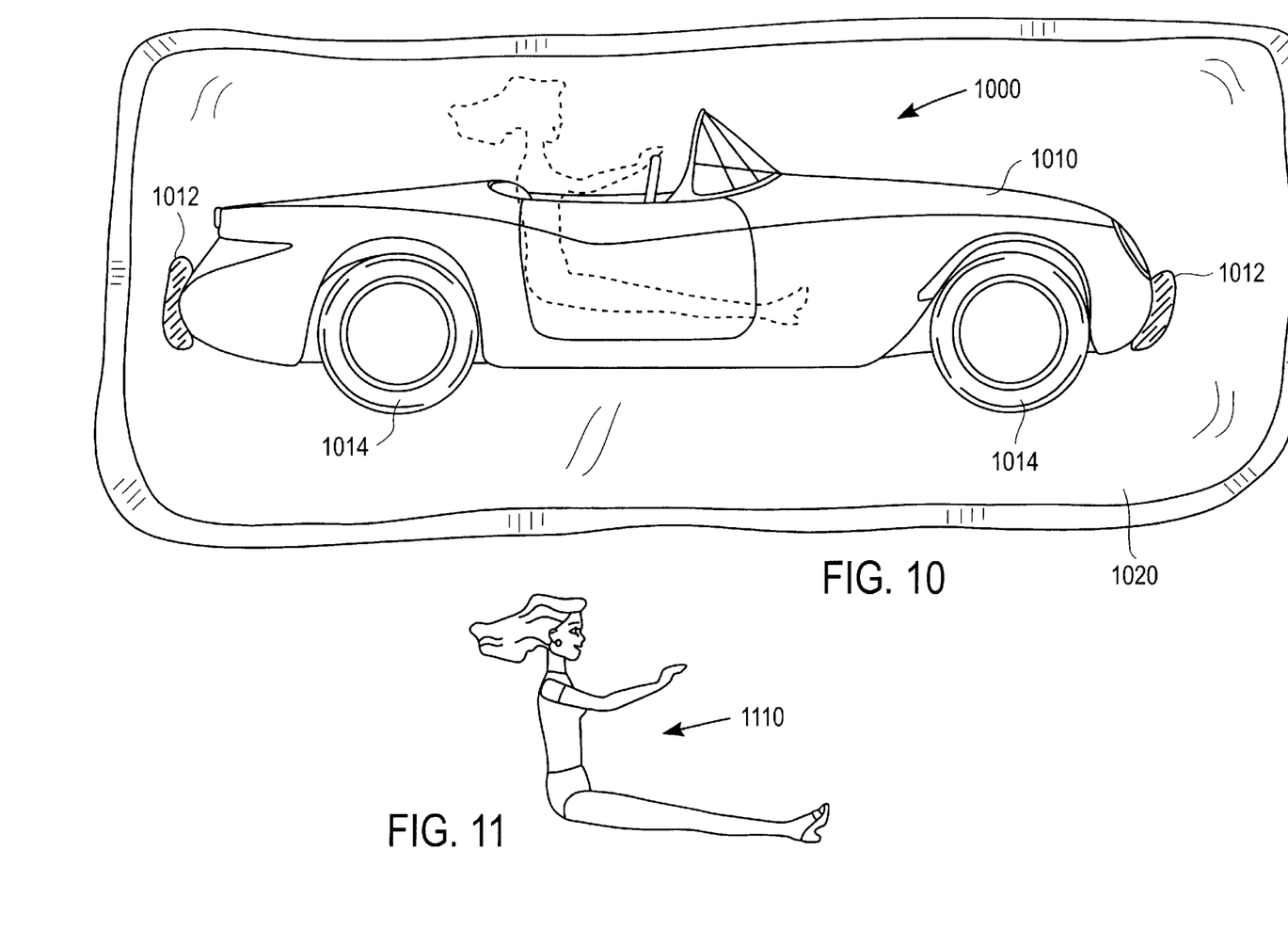
FIGS. 10 and 11 illustrate examples of the edible toy accessories of the present invention as used with an edible conventional toy.

Referring now to FIGS. 10 and 11, examples illustrate the use of the edible toy accessories of the present invention with a conventional toy, which itself (or a portion thereof) is edible. In the example of FIG. 10, a small toy automobile designed to represent the appearance of a conventional toy (such as "Hot Wheels" toys manufactured by Mattel Corporation). In the example of FIG. 10, the toy automobile is fabricated from a hard translucent candy used to form the body IO 100 of the automobile. A flexible gelatin-type edible material may be used to formulate the bumpers 1012 and tires 1014 of the toy automobile. It will be apparent to those of ordinary skill in the art that other types of edible materials may be used to formulate various parts of the edible automobile. The edible toy product, such as the automobile illustrated in FIG. 11, is packaged in a conventional protective wrapping 1020 to preserve the edible toy through repetitive play prior to consumption.

Referring now to FIG. 11, a toy human FIG. 1110 is illustrated as configured as an edible accessory to a conventional non-edible toy or an edible toy such as the edible toy automobile 1000 illustrated in FIG. 10. For example, the arms and legs of the FIG. 1110 may be formulated from a flexible gelatin-type edible material. Garments and a hat and/or shoes worn by the toy FIG. 1 110 may also be formulated from flexible gelatin-type edible materials in a manner similar to the techniques described above in connection with FIG. 4. It will also be apparent to one of ordinary skill in the art that the human toy FIG. 1110 used as an edible toy accessory may be fabricated in various shapes, sizes and colors. Similarly, the figure may be modified to represent a variety of different types of figures or personalities in support of various playful themes. In the example of FIG. 11, the edible toy figure accessory 1110 is configured to fit as a driver of a conventional non-edible toy automobile or the edible toy automobile 1000 shown in FIG. 10. In this manner, the edible toy accessories of the present invention may be used as accessories to edible and non-edible toys in various combinations.

Thus, an apparatus and method for formulating and using edible toy accessories for conventional toys is disclosed. The specific arrangements and methods described herein are merely illustrative of the principals of the present invention.

Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

What is claimed is:

1. A toy comprising:
   a stand-alone toy figure designed as an independent conventional doll; and
   an associated toy accessory composed of an edible material and shaped into a form representing an item wearable by the stand-alone toy and usable as an accessory with the stand-alone toy figure.

2. The toy as claimed in claim 1 wherein the stand-alone toy figure represents a well-known character.

3. The toy as claimed in claim 1 wherein the stand-alone toy figure is edible.

4. The toy as claimed in claim 1 wherein the edible toy accessory can be used with a plurality of different stand-alone toy figures.

5. The toy as claimed in claim 1 wherein the toy accessory is composed of edible material including a plurality of types of edible materials.

6. The toy as claimed in claim 1 wherein the stand-alone toy figure can be marketed separately from the edible toy accessory.

7. The toy as claimed in claim 1 wherein the item wearable by the stand-alone toy figure is a clothing item.

8. The toy as claimed in claim 1 wherein the item wearable by the stand-alone toy figure is a shoe item.

9. The toy as claimed in claim 1 wherein the item wearable by the stand-alone toy figure is a jewelry item.

10. The toy as claimed in claim 1 wherein the item wearable by the stand-alone toy figure is sunglasses.

11. The toy as claimed in claim 1 wherein the item wearable by the stand-alone toy figure is a watch.

12. The toy as claimed in claim 1 wherein the item wearable by the stand-alone toy figure is glasses.

13. A toy comprising:
    a stand-alone toy figure designed as an independent conventional doll; and
    an associated toy accessory composed of an edible material and shaped into a form representing an item that is intended to be held by the stand-alone toy and usable as an accessory with the stand-alone toy figure.

14. The toy as claimed in claim 13 wherein the item is a purse.

15. The toy as claimed in claim 13 wherein the item is a bag.

16. The toy as claimed in claim 13 wherein the item is a ball.

* * * * *